United States Patent [19]

Holbrook et al.

[11] 4,257,320

[45] Mar. 24, 1981

[54] WHOLE FRUIT PEEL OIL EXTRACTOR

[75] Inventors: Franklin K. Holbrook, La Habra; Ronald C. Bushman, Hacienda Heights, both of Calif.

[73] Assignee: Brown International Corporation, Covina, Calif.

[21] Appl. No.: 38,668

[22] Filed: May 14, 1979

[51] Int. Cl.³ .......................... A23N 1/00; B26D 1/00
[52] U.S. Cl. ........................................ 99/509; 83/867; 99/495; 99/516; 198/631; 198/782
[58] Field of Search ................ 99/495, 516, 509, 510; 83/866, 867; 198/782, 631

[56] References Cited

U.S. PATENT DOCUMENTS

| | | | |
|---|---|---|---|
| 3,382,964 | 5/1968 | Bonhoff et al. | 198/782 |
| 3,707,176 | 12/1972 | Bushman | 99/495 |
| 3,954,032 | 5/1976 | Holbrook | 99/509 |
| 4,070,959 | 1/1978 | Bushman et al. | 99/510 |
| 4,111,412 | 9/1978 | Cathers | 198/782 |

*Primary Examiner*—Harvey C. Hornsby
*Assistant Examiner*—Timothy F. Simone
*Attorney, Agent, or Firm*—Lyon & Lyon

[57] ABSTRACT

Parallel horizontal toothed rolls form bights therebetween for reception of non-spherical citrus fruit such as lemons. A body of liquid submerges the toothed rolls so that puncturing of the peel of the fruit takes place below the liquid level. Groups of the toothed rolls are turned in the same direction but at progressively slower speeds. Adjacent toothed rolls are reciprocated axially in opposite directions to change the orientation of the fruit with respect to the toothed rolls. The rolls may be pushed and pulled from one side of the machine through a cam operated device or they may be pushed from both ends by mechanism on opposite sides of the machine.

15 Claims, 15 Drawing Figures

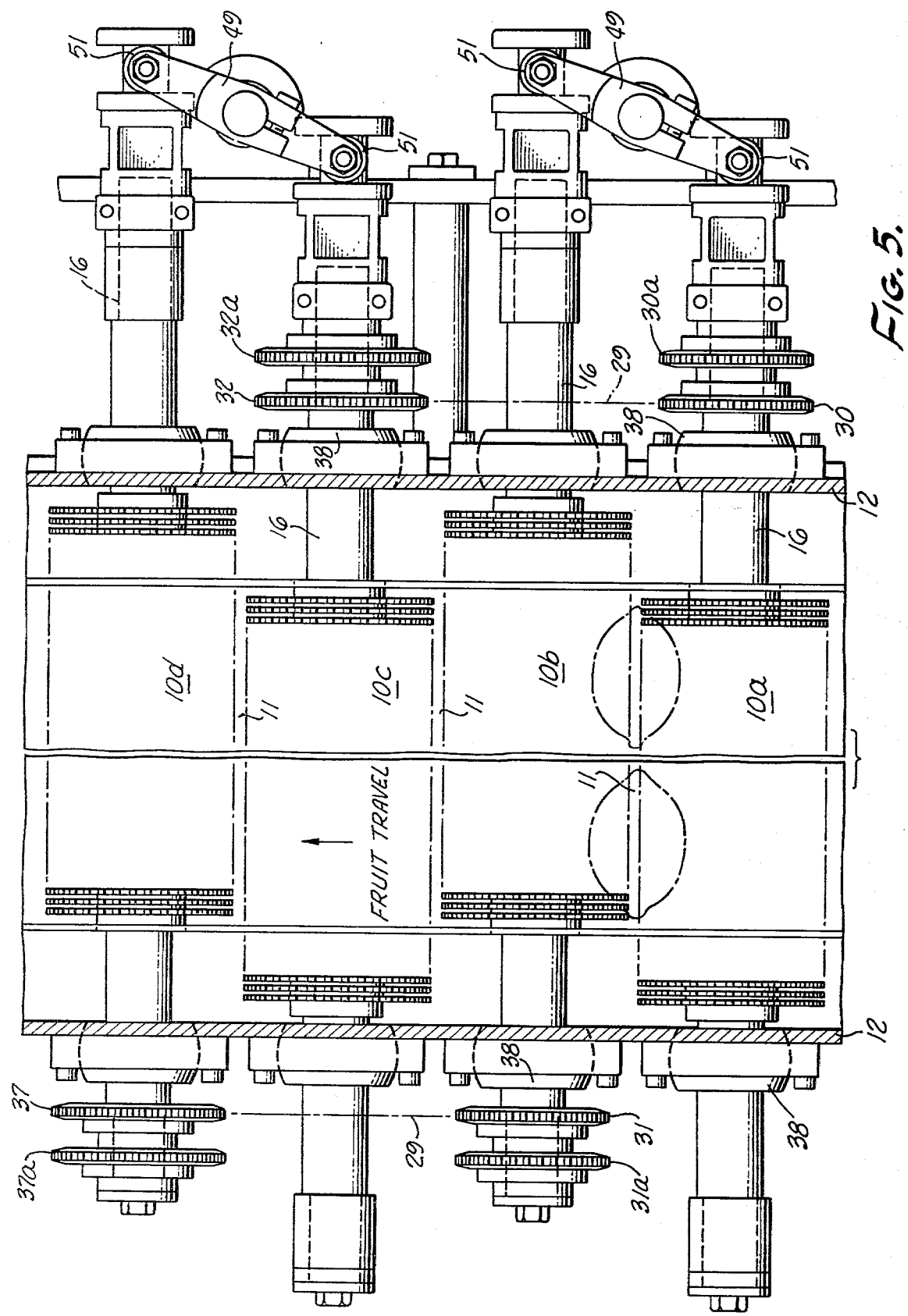

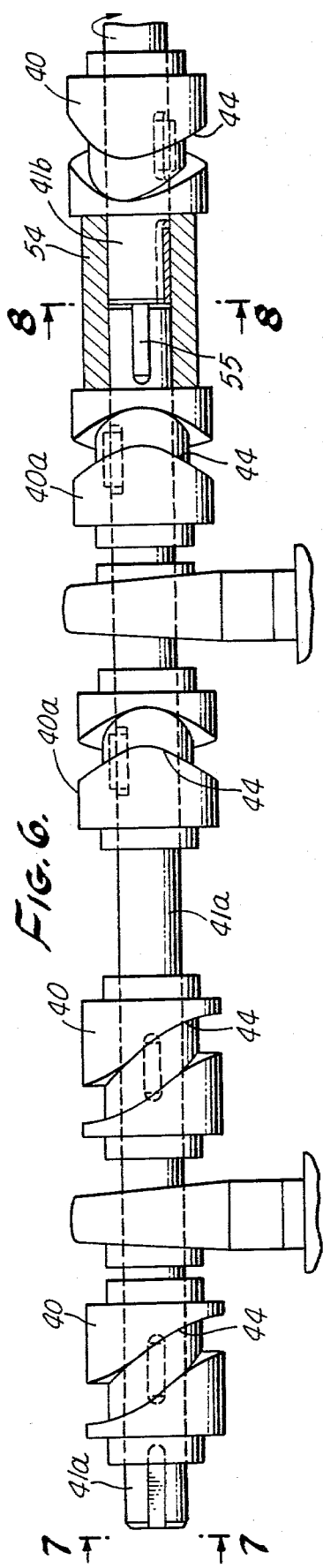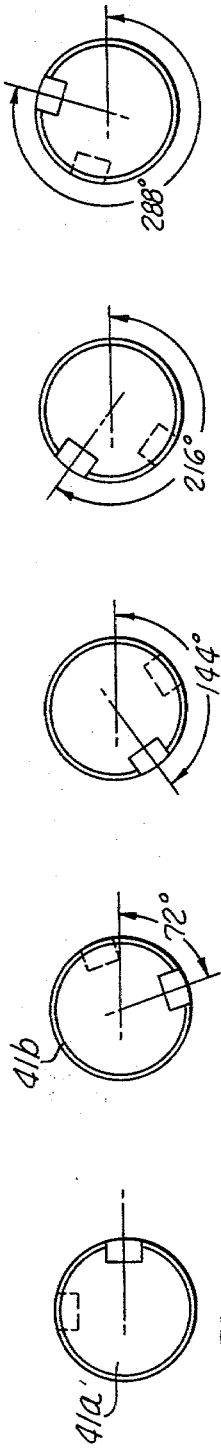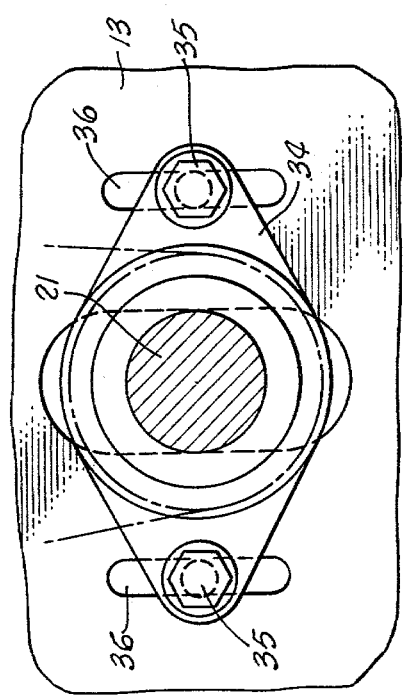

WHOLE FRUIT PEEL OIL EXTRACTOR

This invention relates to apparatus for extracting citrus peel oil from whole fruit. Devices of this general type are shown in the prior patents to Bushman U.S. Pat. Nos. 3,707,176, Holbrook 3,954,032, and in Bushman and Holbrook Pat. No. 4,070,959. In each of these prior patents parallel toothed rolls are disclosed which are horizontal and which form bights between them. The peel of whole fruit in the bights is punctured by the toothed rolls below water level in an open top chamber. The peel oil, which is very volatile, is trapped in the water and is later separated therefrom by conventional means. The toothed rolls are turned under power.

When lemons or other non-spherical citrus fruit are used in such a machine, the lemons tend to turn in the bights about their long axes and resist turning end over end about their short axes, with the result that only a central band around each lemon is thoroughly punctured and the remainder of the surface of the lemon is not punctured to the same degree.

In accordance with this invention, adjacent toothed rolls are not only rotated but are axially shifted to cause the non-spherical citrus fruit to turn approximately 90 degrees and to cause each fruit to turn end over end about its short axis. This significantly increases the yield of citrus peel oil because the entire surface of the fruit, and not just a central band, is contacted by the needle-like points on the toothed rolls.

In a preferred form of this invention, groups of four adjacent toothed rolls are driven at progressively decreasing speeds. Independently, adjacent toothed rolls are reciprocated axially in opposite directions through a cam operated device which operates as a push-pull mechanism engaging one end of the shaft for each toothed roll. In a modified form of the invention, a cam operated mechanism pushes each toothed roll alternately from opposite ends of the roll. In another modification, the push movements take place on both sides of the machine by laterally movable bars operating through thrust bearings against each of the roll shafts.

Other and more detailed objects and advantages will appear hereinafter.

In the drawings:

FIG. 5 is a sectional plan view partly broken away, taken substantially on the lines 5—5 as shown in FIG. 3.

FIG. 6 is a side elevation partly broken away, showing a portion of FIG. 1 on an enlarged scale.

FIG. 7 is an end view taken substantially on the lines 7—7 as shown in FIG. 6.

FIG. 8 is a sectional end view taken substantially on the lines 8—8 as shown in FIG. 6.

FIGS. 9, 10 and 11 are views similar to FIGS. 7 and 8, showing end views of successive segments of the cam shaft.

FIG. 12 is a sectional detail showing the adjustable mounting of the line shafts on the frame.

Figure 1:
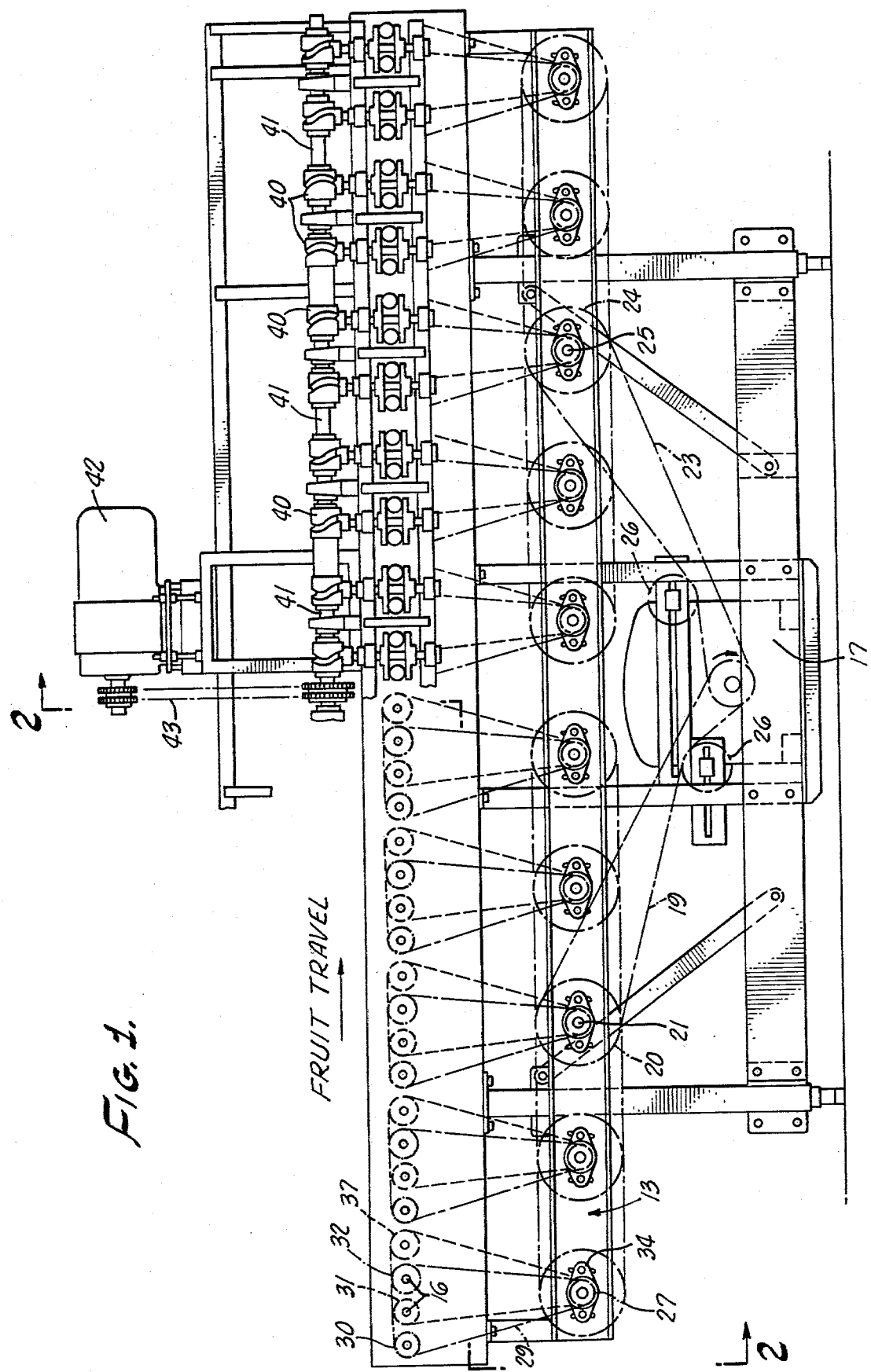
FIG. 1 is a side elevation partly broken away, showing a preferred embodiment of this invention.

Referring to the drawings, toothed rolls 10 are mounted in parallel horizontal position defining bights 11 between them. The toothed rolls 10 extend between stationary side walls 12 on a frame 13 having a bottom wall 14. The side walls 12, bottom wall 14 and end walls (not shown) provide an open top chamber 15 containing water. The water level is slightly above the upper portions of each of the toothed rolls 10. Citrus fruit, such as lemons, rest in the bights 11 and contacted by the toothed rolls below the water level.

In accordance with the disclosure of the Bushman et al U.S. Pat. No. 4,070,959, the first roll 10a in each group of four is driven at a relatively high speed, the next adjacent roll 10b at a slower speed, the next adjacent roll 10c at a still slower speed, and the last roll 10d in each group driven at the slowest speed. For example, the speed of roll 10b may be 90% of that of roll 10a, while roll 10c turns at 90% of the speed of roll 10b, and roll 10d turns at 90% of the speed of roll 10c.

Power for turning all of the toothed rolls 10 is provided by a motor 17 which is mounted on the frame 13 and suspended below the bottom wall 14 of the chamber 15. Driving sprocket 18 fixed on the motor shaft is connected by chain 19 to drive the sprocket 20 fixed on the transverse line shaft 21. Another driving sprocket 22 also fixed to the motor shaft is connected by chain 23 to drive the sprocket 24 on another line shaft 25. Idler sprockets 26 may be provided if desired. Chain and sprocket connections drive other similar line shafts from the line shafts 21 and 25.

Each line shaft is connected by sprockets and chain to turn a group of four toothed rolls 10 in the same direction at different speeds. The chains 29 extending between sprockets 27, 30, 32 and 28, 31, 37 drive the toothed rolls 10 at the desired relative speeds. The driven sprockets 30 and 31 are fixed to roll shafts 16 carried in axially spaced bearings 38 on the frame 13. A second set of sprockets 27a and 28a are fixed on each line shaft and arranged to drive a second set of sprockets 30a and 31a also fixed to the roll shafts 16. This extra set of sprockets 27a, 30a, 32a and 28a, 31a and 37a makes it possible to vary the relative speeds between the line shafts 21 and the roll shafts 16 simply by moving the chains 29 to engage the extra sprockets instead of the first-mentioned set. The height of the line shafts 21 may be shifted by reason of their adjustable mounting on the frame 13, as shown in FIG. 12. The line shaft bearing housings 34 are secured to the frame 13 by means of bolts 35 extending through vertical slots 36 in the frame 13.

Figure 3:
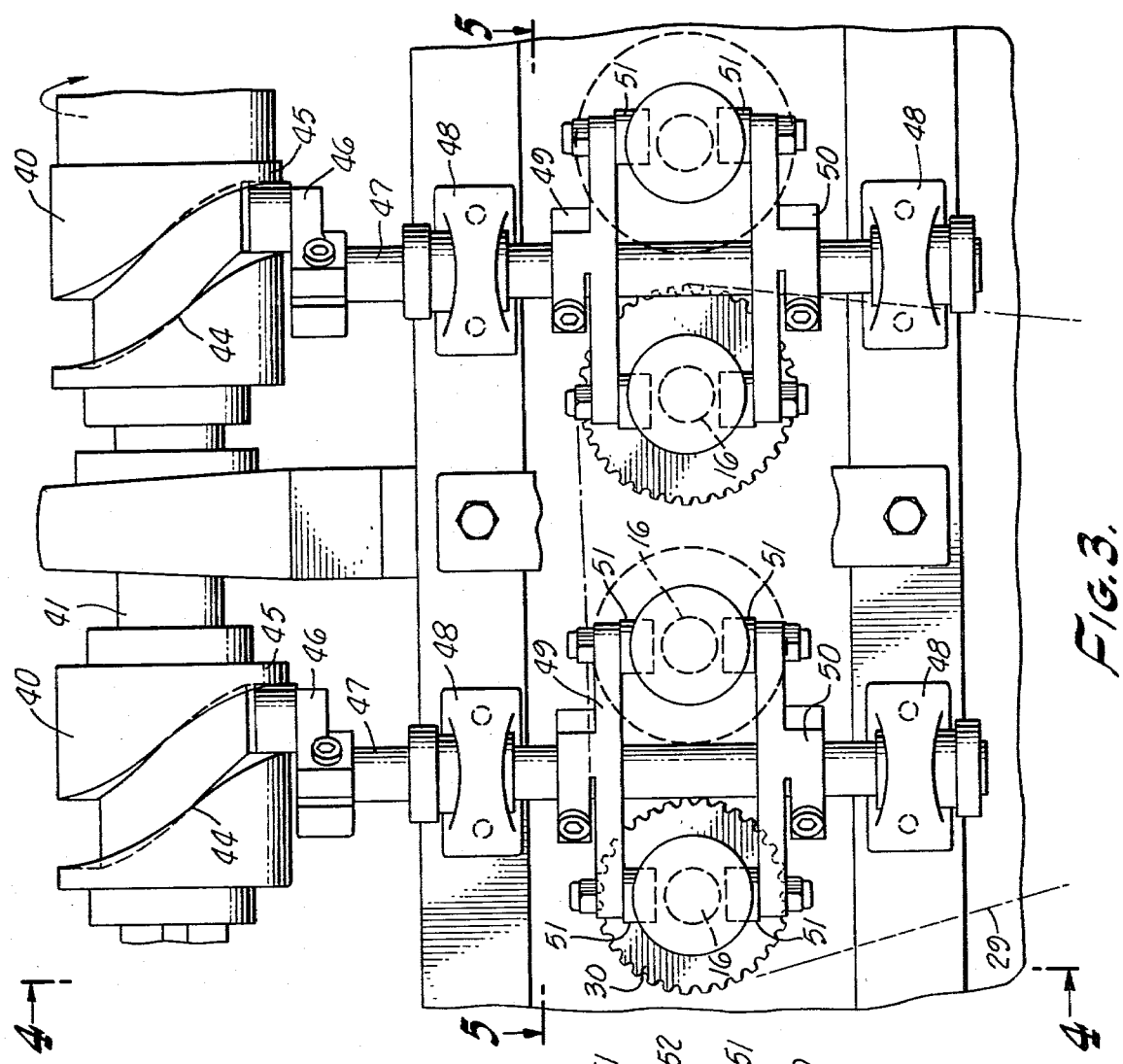
FIG. 3 is a side elevation partly broken away, showing a portion of FIG. 1 on an enlarged scale.
Figure 4:
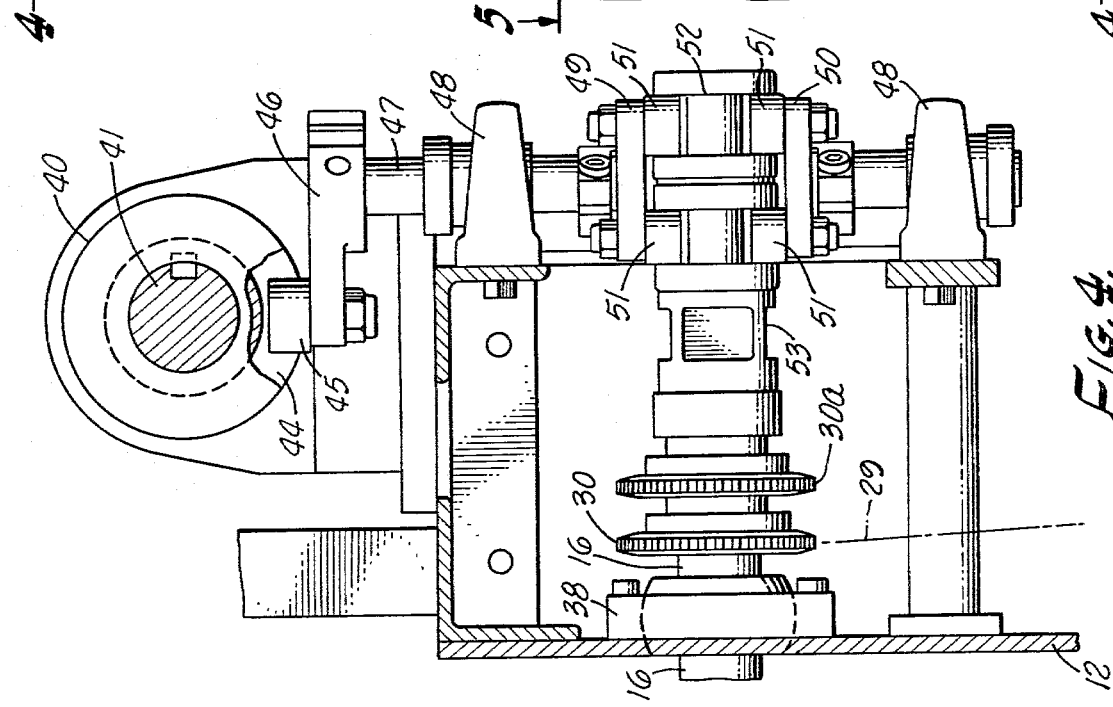
FIG. 4 is a sectional elevation partly broken away, taken substantially on the lines 4—4 as shown in FIG. 3.

In accordance with this invention, means are provided for causing relative axial reciprocating movement of adjacent toothed rolls in order to change the orientation of the lemons with respect to the tooth rolls. As shown in the drawings, this means includes a plurality of barrel cams 40 which are mounted on a segmental cam shaft 41 and serve to drive mechanism which causes axial reciprocation of the toothed rolls 10. An electric motor drives the segmental cam shaft 41 through the chain and sprocket drive 43. As best shown in FIGS. 3 and 4, each barrel cam 40 has a track 44 which receives a cam follower roller 45 mounted on the swinging end of a crank arm 46. The crank arm 46 is fixed to the upper end of a vertical rock shaft 47 carried in axially spaced bearings 48. Also fixed on the rock shaft 47 are a spaced pair of double arm drivers 49 and 50. Rollers 51 are mounted at the swinging ends of the double arm drivers and each is received within a circumferential groove 52 in an extension piece 53 fixed to one end of a roll shaft 16.

From this description it will be understood that the turning of the cam shaft 41 and barrel cams 40 causes the crank arms 46 to cause oscillating movement of the rock shafts 47 as the follower rollers 45 move back and forth in the cam track 44. These oscillating movements of the rock shafts 47 cause the spaced double arm drivers 49 and 50 to reciprocate adjacent roll shafts 16. The side guides 33 prevent lemons from contacting the side walls 12.

Figure 2:
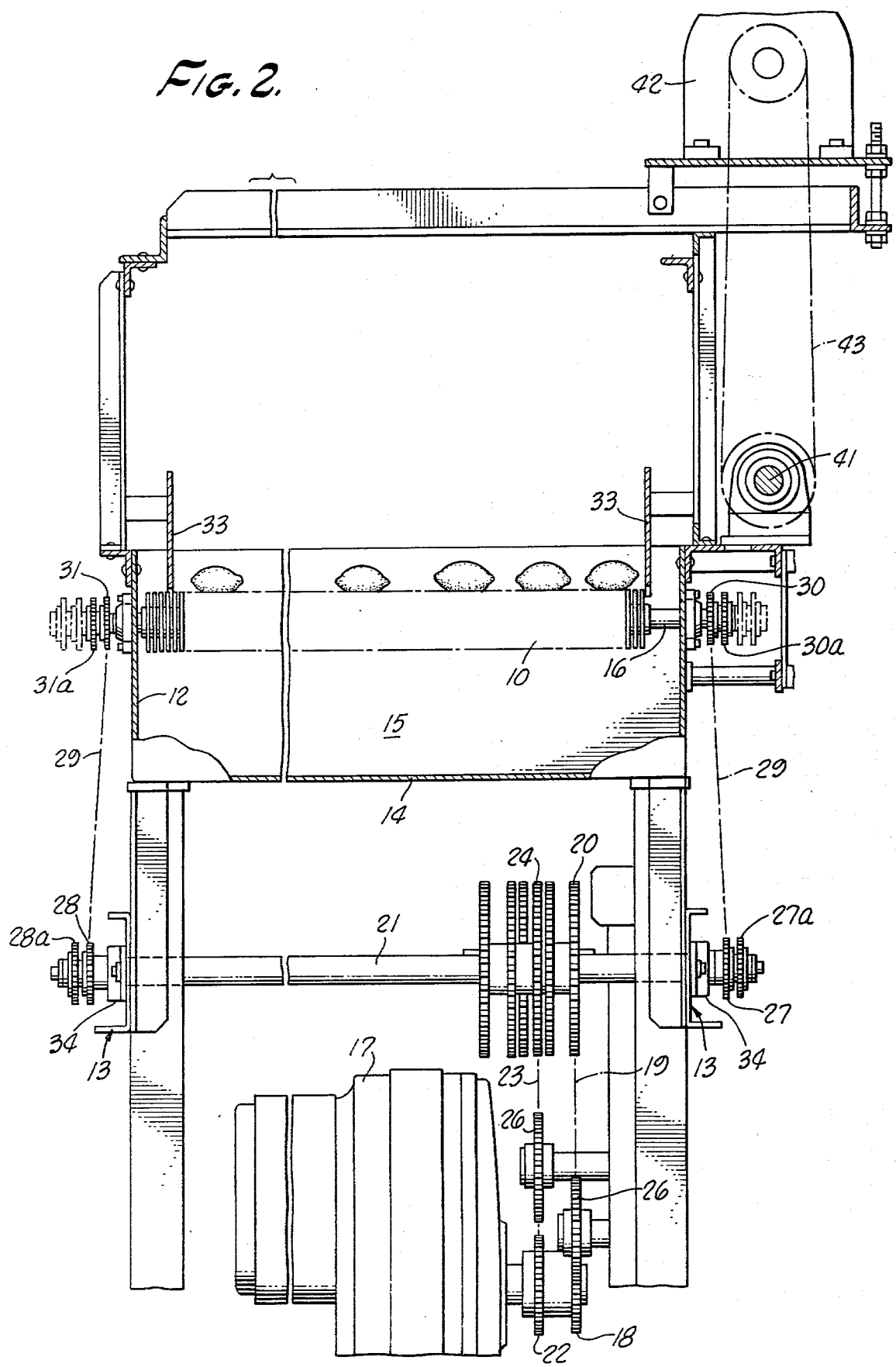
FIG. 2 is a sectional elevation taken substantially on the lines 2—2 as shown in FIG. 1.

As shown in FIG. 2, axial movement of the toothed roll 10 causes the sprockets 30 and 31 to move between two positions, each of which is misaligned to a small degree with respect to the driving sprockets 27 and 28 on the line shaft 21. The misalignment is so small, however, that no difficulty is encountered when the sprockets 30 and 31 move from the full line position to the phantom line position.

As best shown in FIG. 6, the cam shaft 41 is made up of several axially aligned segments put together end to end. Thus, cam shaft segment 41a is connected by coupling 54 and key 55 to the adjacent cam shaft segment 41b. The cam shaft segments are all duplicates and each has two adjacent barrel cams 40 mounted in the same relative angular position and two additional barrel cams 40a fixed at a 90 degree position. The angular staggering of the pairs of barrel cams and the angular staggering of the cam shaft segments 41 serve to equalize the load on the motor 42. When five cam shaft segments are employed, each segment is spaced from its neighbor by one-fifth of a revolution, namely, 72 degrees. This is graphically illustrated in FIGS. 7–11. Thus, the cam shaft segments are all duplicates and the barrel cams are all duplicates, but the cam shaft segments are angularly staggered and the pairs of barrel cams 40 are angularly staggered. The result is that the load on the driving motor 42 is the same for all anxular positions of the toothed rolls 10. Accordingly, the motor 42 may be started and stopped in any position of the toothed rolls.

It should be noted that rotation of the toothed rolls 10 is powered and controlled by the motor 17 whereas axial reciprocation of the toothed rolls 10 is powered and controlled by the motor 42. The speeds of the motors 17 and 42 may be independently adjusted by conventional means.

Apparatus for feeding whole citrus fruit to the toothed rolls is preferably of the type disclosed in the copending application of McKinney Ser. No. 000,029 filed Jan. 2, 1979.

Figure 13:
FIG. 13 is a diagrammatic end elevation showing a modified form of this invention.

In the modified form of the invention shown in FIG. 13, the toothed rolls 60 and roll shafts 61 are similar to those previously described. However, cam mechanism is mounted on both sides of the machine so that each roll shaft is pushed axially in one direction and then pushed axially in the other direction. This is accomplished by means of pairs of eccentrics 63 and 64 which are fixed on parallel horizontal shafts 65 and 66 mounted on opposite sides of the machine. A motor 67 drives through chains and sprockets to turn the eccentric shafts 65 and 66 in timed relationship. Apparatus for rotating the toothed rolls 60 is similar to that previously described but is omitted for clarity of illustration.

Figure 14:
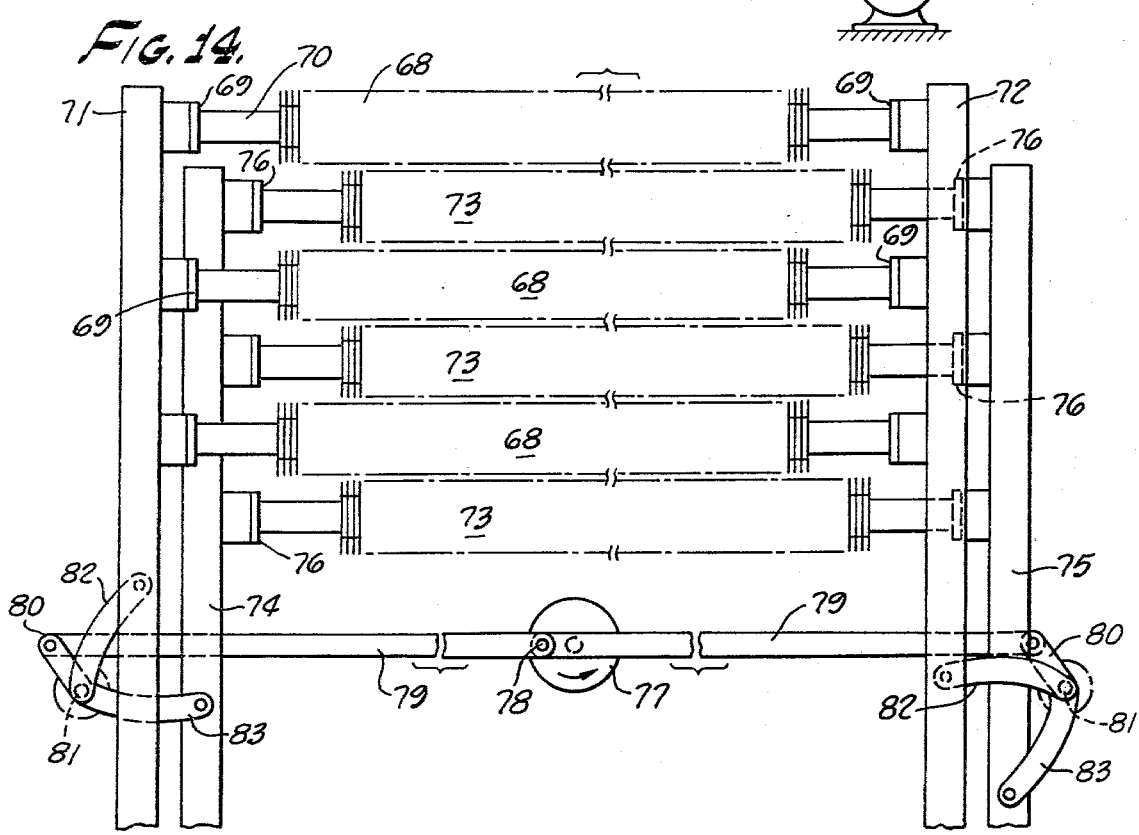
FIG. 14 is a diagrammatic plan view showing another modification.
Figure 15:
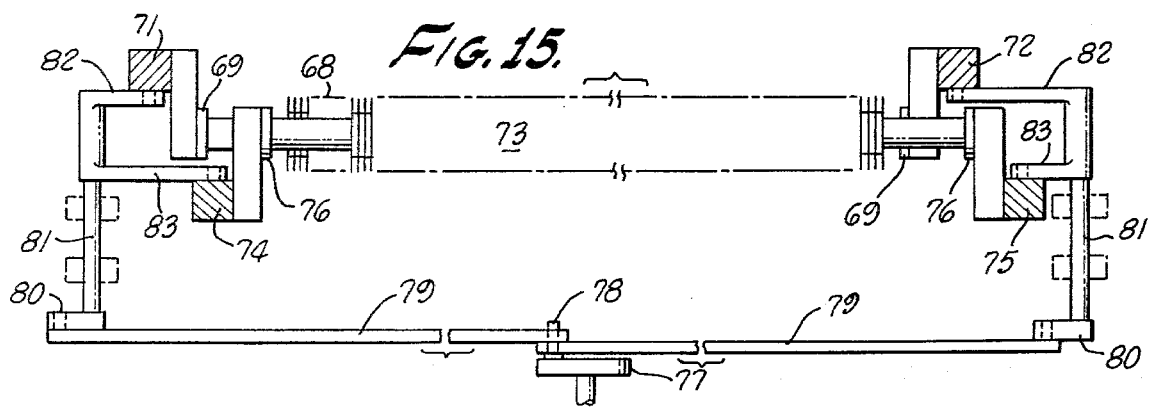
FIG. 15 is a diagrammatic front view partly broken away, showing the device of FIG. 14.

In the second modified form of the invention shown in FIGS. 14 and 15, the toothed rolls 68 are similar to those described above, but the mechanism for reciprocating them axially is different. A thrust bearing 69 is provided at each end of each roll shaft 70. Laterally movalbe parallel horizontal bars 71 and 72 support the thrust bearings 69 for alternate toothed rolls 68. A similar mounting is provided for the other toothed rolls 73, the laterally movable bars 74 and 75 carrying the thrust bearings 76 for the toothed rolls 73.

Mechanism is provided for reciprocating the parallel bars 71 and 72 laterally to push alternate toothed rolls 68 in the same axial direction. The same mechanism acts to shift the parallel bars 74 and 75 to cause axial movement of the other toothed rolls 73. The mechanism comprises a crank 77 having an eccentric driving pin 78 engaging transverse shifter members 79. The members 79 are pivotally connected at opposite ends to crank arms 80 fixed on vertical rock shafts 81. An upper crank arm 82 on the rock shaft 81 is pivotally connected to the upper bar 71. Similarly, a crank arm 83 on each rock shaft 81 is pivotally connected to the lower bar 74. Duplicate shift mechanisms are provided along the length of the device.

From this description it will be understood that the toothed rolls 68 and 73 are alternately pushed in opposite directions by means of the upper bars 71, 72 and by means of the lower bars 74, 75. Apparatus for rotating the toothed rolls 68 and 73 is similar to that previously described in connection with the preferred embodiment, but such roll-rotating apparatus is omitted from the drawings in FIGS. 14 and 15 for clarity of illustration.

Having fully described our invention, it is to be understood that we are not to be limited to the details herein set forth but that our invention is of the full scope of the appended claims.

We claim:

1. Apparatus for extracting peel oil from whole non-spherical citrus fruit such as lemons, comprising, in combination: a pair of parallel horizontal toothed rolls forming a bight therebetween for reception of fruit, means for turning said rolls in the same direction, and means for causing relative axial reciprocating movement of said rolls to change the orientation of the fruit with respect to the rolls.

2. Apparatus for extracting peel oil from whole non-spherical citrus fruit such as lemons, comprising, in combination: a pair of parallel horizontal toothed rolls forming a bight therebetween for reception of fruit, means for turning said rolls in the same direction, and means for axially reciprocating at least one of said rolls to change the orientation of the fruit with respect to the rolls.

3. Apparatus for extracting peel oil from whole non-spherical citrus fruit such as lemons, comprising, in combination: a pair of parallel horizontal toothed rolls forming a bight therebetween for reception of fruit, means for turning said rolls in the same direction, and means for axially reciprocating both of said rolls in opposite directions to change the orientation of the fruit with respect to the rolls.

4. Apparatus for extracting peel oil from whole non-spherical citrus fruit such as lemons, comprising, in combination: a series of parallel horizontal toothed rolls forming a plurality of bights therebetween for reception of fruit, means for turning said rolls in the same direction but at progressively slower speeds, and means for causing relative axial reciprocating movement of said rolls to change the orientation of the fruit with respect to the rolls.

5. Apparatus for extracting peel oil from whole non-spherical citrus fruit such as lemons, comprising, in combination: a series of parallel horizontal toothed rolls forming a plurality of bights therebetween for reception of fruit, means for turning said rolls in the same direction but at progressively slower speeds, and means for axially reciprocating at least one of said rolls to change the orientation of the fruit with respect to the rolls.

6. Apparatus for extracting peel oil from whole non-spherical citrus fruit such as lemons, comprising, in combination: a series of parallel horizontal toothed rolls forming a plurality of bights therebetween for reception of fruit, means for turning said rolls in the same direction but at progressively slower speeds, and means for axially reciprocating both of said rolls in opposite directions to change the orientation of the fruit with respect to the rolls.

7. Apparatus for extracting peel oil from whole non-spherical citrus fruit such as lemons, comprising, in combination: a plurality of series of parallel horizontal toothed rolls forming a plurality of bights therebetween for reception of fruit, means for turning said rolls in each series in the same direction but at progressively slower speeds, and means for axially reciprocating adjacent rolls in each series in opposite directions to change the orientation of the fruit with respect to the rolls.

8. Apparatus for extracting peel oil from whole non-spherical citrus fruit such as lemons, comprising, in combination: a pair of parallel horizontal toothed rolls forming a bight therebetween for reception of fruit, a body of liquid partially submerging said rolls so that puncturing of the peel of the fruit by said toothed rolls takes place below the level of the liquid, means for turning said rolls in the same direction but at different speeds, and means for causing relative axial reciprocating movement of said rolls to change the orientation of the fruit with respect to the rolls.

9. Apparatus for extracting peel oil from whole non-spherical citrus fruit such as lemons, comprising, in combination: a pair of parallel horizontal toothed rolls forming a bight therebetween for reception of fruit, chain and sprocket means for turning said rolls in the same direction but at different speeds, and cam-controlled means for causing relative axial reciprocating movement of said rolls to change the orientation of the fruit with respect to the rolls.

10. Apparatus for extracting peel oil from whole non-spherical citrus fruit such as lemons, comprising, in combination: a pair of parallel horizontal toothed rolls forming a bight therebetween for reception of fruit, a body of liquid partially submerging said rolls so that puncturing of the peel of the fruit by said toothed rolls takes place below the level of the liquid, means for turning said rolls in the same direction, a power driven cam, and means including a cam follower for causing relative axial reciprocating movement of said rolls to change the orientation of the fruit with respect to the rolls.

11. Apparatus for extracting peel oil from whole non-spherical citrus fruit such as lemons, comprising, in combination: a plurality of series of parallel horizontal toothed rolls forming a plurality of bights therebetween for reception of fruit, means for turning said rolls in each series in the same direction but at progressively slower speeds, a power driven cam, and means including a cam follower for axially reciprocating adjacent rolls in each series in opposite directions to change the orientation of the fruit with respect to the rolls.

12. Apparatus for extracting peel oil from whole non-spherical citrus fruit such as lemons, comprising, in combination: a pair of parallel horizontal toothed rolls forming a bight therebetween for reception of fruit, means for turning said rolls in the same direction, cam-controlled means for causing relative axial reciprocating movement of said rolls to change the orientation of the fruit with respect to the rolls, said means including a power driven barrel cam having a circumferential track, a rock shaft having a crank arm with a cam follower engaging said track, and means on said rock shaft for reciprocating said toothed rolls axially in opposite directions.

13. Apparatus for extracting peel oil from whole non-spherical citrus fruit such as lemons, comprising, in combination: a plurality of parallel horizontal toothed rolls forming bights therebetween for reception of fruit, power means for turning said rolls in the same direction, means for causing relative axial shifting movement of said rolls to change the orientation of the fruit with respect to the rolls, said means including a horizontal segmental cam shaft extending at right angles with respect to said rolls, each cam shaft segment having two spaced pairs of barrel cams fixed thereto, the barrel cams all being duplicates, one pair being mounted at 90 degree angular spacing with respect to the other pair, coupling means connecting the cam shaft segments in axial alignment and in angularly spaced relationship, and means including a follower engaging each barrel cam for reciprocating two adjacent toothed rolls in opposite directions.

14. Apparatus for extracting peel oil from whole non-spherical citrus fruit such as lemons, comprising, in combination: a pair of parallel horizontal toothed rolls forming a bight therebetween for reception of fruit, each toothed roll including a roll shaft, means for turning said roll shafts in the same direction, cam-controlled means for causing relative axial reciprocating movement of said rolls to change the orientation of the fruit with respect to the rolls, said means including parallel rotary drive shafts at right angles to said toothed rolls, and a plurality of spaced eccentrics fixed to each of said drive shafts, each eccentric being positioned to engage one end of each roll shaft to push that roll shaft axially in one direction, and power means for rotating said drive shafts in timed relationship.

15. Apparatus for extracting peel oil from whole non-spherical citrus fruit such as lemons, comprising, in combination: a pair of parallel horizontal toothed rolls forming a bight therebetween for reception of fruit, each toothed roll including a roll shaft, means for turning said roll shafts in the same direction, cam-controlled means for causing relative axial reciprocating movement of said rolls to change the orientation of the fruit with respect to the rolls, said means comprising a first pair of parallel horizontal bars, means whereby each bar operatively engages one end of alternate roll shafts, a second pair of parallel horizontal bars each having means for engaging one end of the remaining roll shafts, and power means for laterally reciprocating both pairs of parallel bars in timed relationship.

* * * * *